(12) United States Patent
Chung et al.

(10) Patent No.: US 10,084,649 B2
(45) Date of Patent: Sep. 25, 2018

(54) TERMINAL FOR INTERNET OF THINGS AND OPERATION METHOD OF THE SAME

(71) Applicants: SAMSUNG ELECTRONICS CO., LTD., Suwon-si, Gyeonggi-do (KR); KOREA ELECTRONICS TECHNOLOGY INSTITUTE, Seongnam-si, Gyeonggi-do (KR)

(72) Inventors: Ji-min Chung, Yongin-si (KR); Seung-woo Kum, Yongin-si (KR); Young-sun Ryu, Seongnam-si (KR); Tae-beom Lim, Yongin-si (KR)

(73) Assignees: SAMSUNG ELECTRONICS CO., LTD., Suwon-si, Gyeonggi-do (KR); KOREA ELECTRONICS TECHNOLOGY INSTITUTE, Seongnam-si, Gyeonggi-do (KR)

( * ) Notice: Subject to any disclaimer, the term of this patent is extended or adjusted under 35 U.S.C. 154(b) by 57 days.

(21) Appl. No.: 14/831,160

(22) Filed: Aug. 20, 2015

(65) Prior Publication Data

US 2016/0112268 A1     Apr. 21, 2016

(30) Foreign Application Priority Data

Oct. 17, 2014   (KR) .................. 10-2014-0141204

(51) Int. Cl.
*H04W 4/00*     (2018.01)
*H04L 12/24*    (2006.01)
(Continued)

(52) U.S. Cl.
CPC ...... *H04L 41/0836* (2013.01); *H04L 12/2803* (2013.01); *H04L 45/26* (2013.01);
(Continued)

(58) Field of Classification Search
CPC ....... H04W 4/70; H04W 4/005; H04W 76/02; H04W 76/10; H04W 48/16; H04L 41/0836; H04L 12/2803; H04L 45/26
(Continued)

(56) References Cited

U.S. PATENT DOCUMENTS 8,260,261 B2   9/2012 Teague
9,615,322 B2 * 4/2017 Choi ..................... H04W 4/70
(Continued)

FOREIGN PATENT DOCUMENTS

EP   2739020   6/2014
EP   2747370   6/2014
(Continued)

OTHER PUBLICATIONS

Search Report and Written Opinion dated Dec. 17, 2015 in counterpart International Patent Application No. PCT/KR2015/008649.
(Continued)

*Primary Examiner* — Thai Hoang
(74) *Attorney, Agent, or Firm* — Nixon & Vanderhye, P.C.

(57) ABSTRACT

An example Internet of Things (IoT) terminal includes communication circuitry configured to communicate with an IoT apparatus and a data processor configured to transmit, to the IoT apparatus, a request for establishing a connection to the IoT apparatus, and to recognize a physical signal as a response signal output from the IoT apparatus in response to the request for establishing a connection.

21 Claims, 12 Drawing Sheets

(51) Int. Cl.
  *H04W 4/70* (2018.01)
  *H04W 76/10* (2018.01)
  *H04L 12/721* (2013.01)
  *H04W 48/16* (2009.01)
  *H04W 76/02* (2009.01)
  *H04L 12/28* (2006.01)

(52) U.S. Cl.
  CPC ............. *H04W 4/005* (2013.01); *H04W 4/70* (2018.02); *H04W 48/16* (2013.01); *H04W 76/02* (2013.01); *H04W 76/10* (2018.02)

(58) Field of Classification Search
  USPC .......................................................... 370/338
  See application file for complete search history.

(56) References Cited

U.S. PATENT DOCUMENTS

| | | | |
|---|---|---|---|
| 9,641,400 B2* | 5/2017 | Britt | H04L 41/22 |
| 2009/0278479 A1 | 11/2009 | Platner et al. | |
| 2011/0143666 A1 | 6/2011 | Lee | |
| 2012/0243743 A1 | 9/2012 | Pastor et al. | |
| 2013/0041997 A1 | 2/2013 | Li et al. | |
| 2013/0042244 A1* | 2/2013 | Li | H04L 67/34 |
| | | | 718/100 |
| 2013/0311570 A1 | 11/2013 | Kuo | |
| 2014/0244710 A1 | 8/2014 | Sharma et al. | |
| 2014/0244834 A1* | 8/2014 | Guedalia | H04L 67/16 |
| | | | 709/224 |
| 2014/0324973 A1* | 10/2014 | Goel | H04L 12/2803 |
| | | | 709/204 |
| 2015/0006296 A1* | 1/2015 | Gupta | G06Q 30/0269 |
| | | | 705/14.66 |
| 2015/0006719 A1* | 1/2015 | Gupta | H04L 67/16 |
| | | | 709/224 |
| 2015/0121470 A1* | 4/2015 | Rongo | H04L 41/0813 |
| | | | 726/4 |
| 2015/0156266 A1* | 6/2015 | Gupta | H04L 67/12 |
| | | | 709/224 |
| 2015/0201035 A1* | 7/2015 | Profit | H04L 67/2842 |
| | | | 709/213 |
| 2015/0249672 A1* | 9/2015 | Burns | H04L 12/66 |
| | | | 726/4 |
| 2016/0087933 A1* | 3/2016 | Johnson | H04W 4/001 |
| | | | 709/245 |
| 2016/0088049 A1* | 3/2016 | Seed | G06F 9/541 |
| | | | 709/203 |
| 2016/0112487 A1* | 4/2016 | Wang | G06F 9/54 |
| | | | 709/201 |
| 2016/0119434 A1* | 4/2016 | Dong | H04L 41/5054 |
| | | | 709/220 |
| 2016/0164728 A1* | 6/2016 | Chakrabarti | H04L 63/029 |
| | | | 370/254 |

FOREIGN PATENT DOCUMENTS

| | | |
|---|---|---|
| JP | 2012-175148 | 9/2012 |
| KR | 10-2014-0045829 | 4/2014 |
| KR | 10-2004-0076948 | 6/2014 |
| KR | 10-2014-0117107 | 10/2014 |
| WO | 2014/137524 | 9/2014 |

OTHER PUBLICATIONS

Extended European search report dated Apr. 6, 2018 in counterpart EP Application No. 15851487.7.

* cited by examiner

TERMINAL FOR INTERNET OF THINGS AND OPERATION METHOD OF THE SAME

CROSS-REFERENCE TO RELATED APPLICATION

This application is based on and claims priority under 35 U.S.C. § 119 to Korean Patent Application No. 10-2014-0141204, filed on Oct. 17, 2014, in the Korean Intellectual Property Office, the disclosure of which is incorporated by reference herein in its entirety.

BACKGROUND

One or more example embodiments relate to an Internet of Things (IoT) terminal and an operation method thereof, and more particularly, to an IoT terminal that may establish a connection between a user and an IoT apparatus and an operation method thereof.

Internet of Things (IoT) refers to a technology that enables a variety of "things" to connect to the Internet by embedding a computer chip and a communication function. An IoT apparatus may be a general apparatus (or a "thing") to which IoT is applied. Examples of IoT apparatus include sensors, such as a temperature sensor, a humidity sensor, a sound sensor, a motion sensor, a proximity sensor, a gas sensing sensor, or a heat sensing sensor; home appliances, such as a refrigerator, a CCTV, a TV, a washing machine, or a dehumidifier; electric lights; fire alarms; and household appliances.

A user may remotely control an IoT apparatus by using an IoT terminal. The IoT terminal and the IoT apparatus may be connected to each other via various communication techniques, such as wireless communication, short distance (wired or wireless) communication, or home network, or other communication protocols.

In an IoT system, reliability is required to ensure that a user remotely controlling an IoT apparatus is a legitimate (or authorized) user with regard to the IoT apparatus. That is, the IoT system is required to prevent an illegitimate (or unauthorized) user from controlling the IoT apparatus without permission.

SUMMARY

One or more example embodiments include an Internet of Things (IoT) terminal that may establish a connection between a user and an IoT apparatus and an operation method thereof.

Additional aspects will be set forth in part in the description which follows and, in part, will be apparent from the description, or may be learned by practice of the presented example embodiments.

According to one or more example embodiments, an Internet of things (IoT) terminal includes a communication unit configured to communicate with an IoT apparatus; and a data processor configured to transmit a request, to the IoT apparatus, for establishing a connection between a user and the IoT apparatus, and to recognize a physical signal as a response signal output from the IoT apparatus in response to the request for establishing a connection.

The IoT terminal may further include a sensor configured to sense the response signal, wherein the response signal may include at least one of light and sound, and the data processor may be configured to recognize the response signal based on the sensing by the sensor.

When transmitting the request for establishing a connection, the data processor may start a timer, and the IoT terminal may be configured to recognize the response signal from the IoT apparatus during a time period set by the timer.

The data processor may be configured to search for at least one apparatus to establish a connection with the user, select one of the at least one apparatus as the IoT apparatus, and transmit the request for establishing a connection to the selected IoT apparatus.

The data processor may be configured to search for the at least one apparatus by sending a discovery packet (or packets) and receiving a response packet (or packets) from the at least one apparatus.

The IoT terminal may further include an output unit configured to display a search list indicating at least one apparatus found based on the search; and an input unit configured to receive a user input selecting one of the at least one apparatus as the IoT apparatus.

The IoT terminal may further include an input unit configured to receive a user input confirming recognition of the response signal, wherein the data processor may be configured to recognize the response signal based on the user input confirming recognition.

The IoT terminal may further include an output unit configured to display a user interface (UI) for receiving a user input indicating whether the user recognizes the response signal.

The data processor may be configured to register connection information in a server, wherein the connection information may indicate an established connection between the user and the IoT apparatus.

When the data processor recognizes the response signal, the data processor may be configured to transmit a notification to the IoT apparatus indicating that a connection between the user and the IoT apparatus has been established.

According to one or more example embodiments, a method of operating an IoT terminal includes transmitting, to the IoT apparatus, a request for establishing a connection between a user and the IoT apparatus; and recognizing a physical signal as a response signal output from the IoT apparatus in response to the request for establishing a connection.

The response signal may include at least one of light and sound.

The recognizing of the response signal may include starting a timer when transmitting the request for establishing a connection; and recognizing the response signal from the IoT apparatus during a time period set by the timer.

The method may further include searching for at least one apparatus to establish a connection with the user; selecting one of the at least one IoT apparatus as the IoT apparatus, and transmitting the request for establishing a connection to the IoT apparatus.

The searching for the at least one apparatus may include sending a discovery packet (or packets); receiving a response packet (or packets) from the at least one apparatus; and determining the at least one apparatus based on the response packet.

The selecting of the IoT apparatus may include displaying a search list indicating at least one apparatus found based on the search; and receiving a user input selecting one of the at least one apparatus as the IoT apparatus.

The recognizing of the response signal may include receiving a user input confirming recognition of the response signal, and recognizing the response signal based on the user input confirming recognition.

The method may further include displaying a UI configured to receive a user input for indicating whether the user recognizes the response signal.

The method may further include registering connection information in a server, wherein the connection information indicates an established connection between the user and the IoT apparatus.

According to one or more example embodiments, an IoT apparatus includes a request receiver module configured to receive, from an IoT terminal, a request for establishing a connection between a user and an IoT apparatus; and a response module configured to output a response signal in response to the request.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
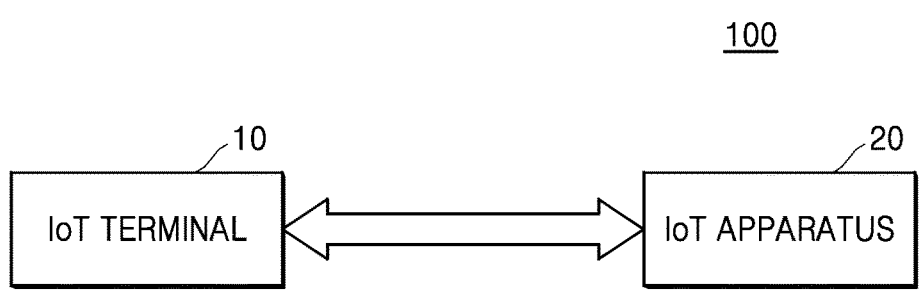
FIG. 1 is a block diagram showing an illustrative configuration of an example IoT system 100.

Reference will now be made in detail to example embodiments which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects of the present description. Expressions such as "at least one of," when preceding a list of elements, modify the entire list of elements and do not modify the individual elements of the list.

The attached drawings for illustrating example embodiments of the present disclosure are referred to in order to gain a sufficient understanding of the present disclosure, the merits thereof, and objectives accomplished by the implementation of the present disclosure. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art, and the present disclosure will only be defined by the appended claims.

Hereinafter, the terms used in the specification will be briefly described, and then the present disclosure will be described in detail.

As used herein, an 'Internet of things (IoT) apparatus' may refer to any electronic apparatus or computing apparatus, which may be connected to the Internet.

As used herein, an 'IoT terminal' may refer to any electronic apparatus or computing apparatus, which may control an IoT apparatus.

As used herein, a 'server' may refer to any electronic apparatus or computing apparatus which may be connected to an IoT terminal and provide an IoT service via which an IoT terminal may remotely access an IoT apparatus to control the same.

The terms used in this specification are those general terms currently widely used in the art in consideration of functions regarding the concepts disclosed herein, but the terms may vary according to the intention of those of ordinary skill in the art, precedents, or new technology in the art. Also, some terms may be arbitrarily selected by the applicant, and in this case, the meaning of the selected terms will be described in detail in the detailed description of the present specification. Thus, the terms used herein have to be defined based on the meaning of the terms together with the description throughout the specification.

FIG. 1 is a block diagram showing an illustrative configuration of an example IoT system 100.

Referring to FIG. 1, the IoT system 100 includes an IoT terminal 10 and an IoT apparatus 20.

The IoT terminal 10 is a device that may remotely control the IoT apparatus 20. The IoT terminal 10 may be realized by various electronic devices, including, but not limited to, smart devices including smartphones, or tablet PCs, portable electronic devices, wearable devices, home terminals that may be connected to a home network, smart TVs, or set top boxes.

The IoT apparatus 20 may be a general apparatus (or a thing) to which IoT is applied. Examples of the IoT apparatus 20 include, but are not limited to, sensors, such as a temperature sensor, a humidity sensor, a sound sensor, a motion sensor, a proximity sensor, a gas sensing sensor, or a heat sensing sensor; home appliances, such as a refrigerator, a CCTV, a TV, a washing machine, or a dehumidifier; electric lights; fire alarms; and household appliances. However, the various embodiments described herein are not limited to these examples.

The IoT terminal 10 and the IoT apparatus 20 may be connected to each other using various communication techniques, such as wireless communication, short distance (wired or wireless) communication, home network, and/or other communication protocols.

However, in order for a user to control the IoT apparatus 20 wirelessly via the IoT terminal 10, a connection between the user and the IoT apparatus 20 is required to be established in advance in a server (not shown). The server is required to prevent an illegitimate or unauthorized user from controlling the IoT apparatus 20 without permission. In order for the server to determine whether a user requesting to control the IoT apparatus 20 is a legitimate or authorized user, information about the user and the IoT apparatus 20 is required to be registered in the server.

To this end, a user may establish a connection between the user and the IoT apparatus 20 by using the IoT terminal 10, and information about the connection may be registered in the server.

Hereinafter a method of establishing a connection between a user and the IoT apparatus 20 will be described.

Figure 2:
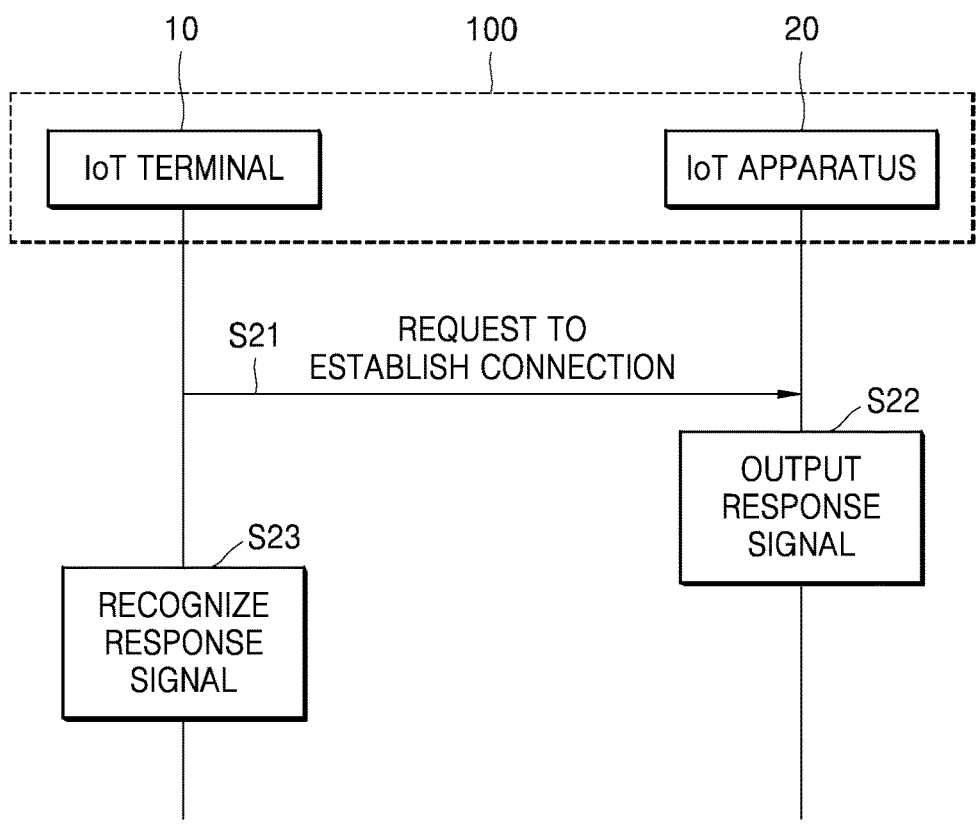
FIG. 2 is a flowchart showing an illustrative operation method of the example IoT system 100 of FIG. 1.

FIG. 2 is a flowchart showing an illustrative operation method of the example IoT system 100 of FIG. 1.

Referring to FIG. 2, the IoT terminal 10 may transmit a request for establishing a connection to the IoT apparatus 20 (S21). A request for establishing a connection is a request for establishing a connection between a user and the IoT apparatus 20. The IoT terminal 10 may send a request for establishing a connection as a packet (or packets) to the IoT apparatus 20.

The IoT apparatus 20 that receives the request for establishing a connection may output a response signal in response to the request for establishing a connection (S22). The IoT apparatus 20 may respond to the request for establishing a connection by obtaining the response signal related to the request for establishing a connection and outputting the response signal.

A "response signal" refers, for example, to a signal whose transmission distance is within a predetermined radius. For example, the response signal may be a physical signal such as light, sound, heat, pressure, magnetism, a particular motion, etc. A response signal may include at least one of light and sound.

For example, a response signal may include light within the visible spectrum or sound within the audible frequency range. Particularly, a response signal may be blinking from a light source, such as a light emitting diode (LED). Alternatively, a response signal may be a beeping sound. In this case, if a user is within a predetermined radius from the IoT apparatus 20, the user may recognize a response signal.

Alternately, a response signal may include light within the non-visible spectrum or sound within the inaudible frequency range.

However, a response signal is not limited to the above described examples. A response signal may be realized by a variety of signals.

The IoT terminal 10 may recognize the response signal from the IoT apparatus 20 (S23). The IoT terminal 10 may recognize the physical signal as the response signal from the IoT apparatus 20. When the IoT apparatus 20 recognizes the response signal, the IoT terminal 10 may establish a connection with the IoT apparatus 20.

If the IoT terminal 10 recognizes the response signal output from the IoT apparatus 20, the IoT terminal 10 may be within a predetermined radius from the IoT apparatus 20 because a transmission distance of a response signal is limited. That is, when the IoT terminal 10 recognizes a response signal from the IoT apparatus 20, the IoT terminal 10 may be within a short distance from the IoT apparatus 20, and a user using the IoT terminal 10 may be trusted as a legitimate or authorized user of the IoT apparatus 20.

A transmission distance of a response signal output from the IoT apparatus 20 may be adjusted depending on whether a user located within the transmission distance from the IoT apparatus 20 is to be considered as a legitimate or authorized user.

As such, in some embodiments, by using the interaction of a request for establishing a connection between the IoT terminal 10 and the IoT apparatus 20 and a response thereto, a connection between the IoT terminal 10 and the IoT apparatus 20 may be established without physical contact with the IoT apparatus 20 by a user. That is, by reducing interference of a user, user-friendliness may be improved. In addition, as it is highly likely that the user is present within a short distance of the IoT apparatus 20, the reliability of the established connection between the user and IoT apparatus 20 may be improved.

Figure 3:
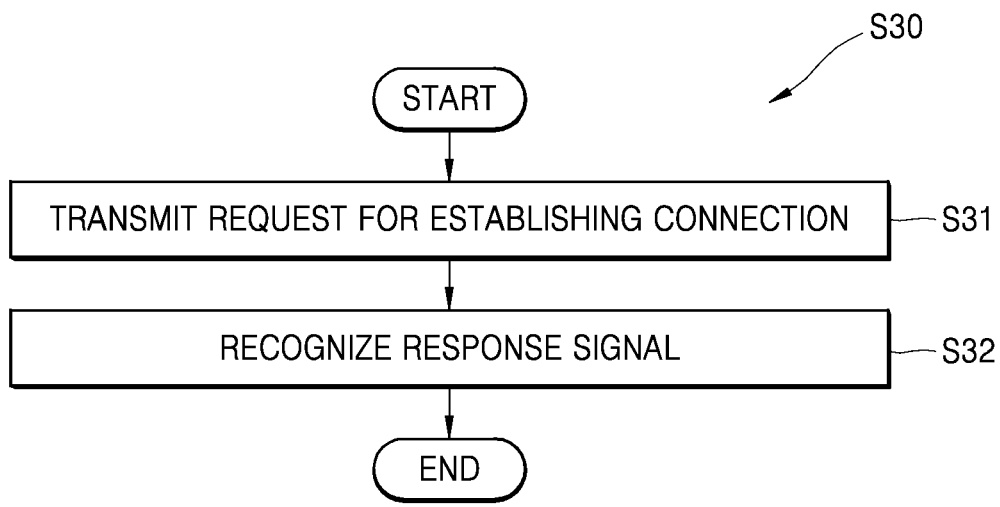
FIG. 3 is a flowchart showing an illustrative operation method (S30) of the example IoT terminal of FIG. 1.

FIG. 3 is a flowchart of an illustrative operation method (S30) of the example IoT terminal 10 of FIG. 1.

Referring to FIGS. 1 and 3, the IoT terminal 10 may transmit a request for establishing a connection to the IoT apparatus 20 (S31). The IoT terminal 10 may recognize a response signal from the IoT apparatus 20 (S32). The IoT terminal 10 may recognize a response signal from the IoT apparatus 20 in various ways depending on how the IoT apparatus 20 responds.

Figure 4:
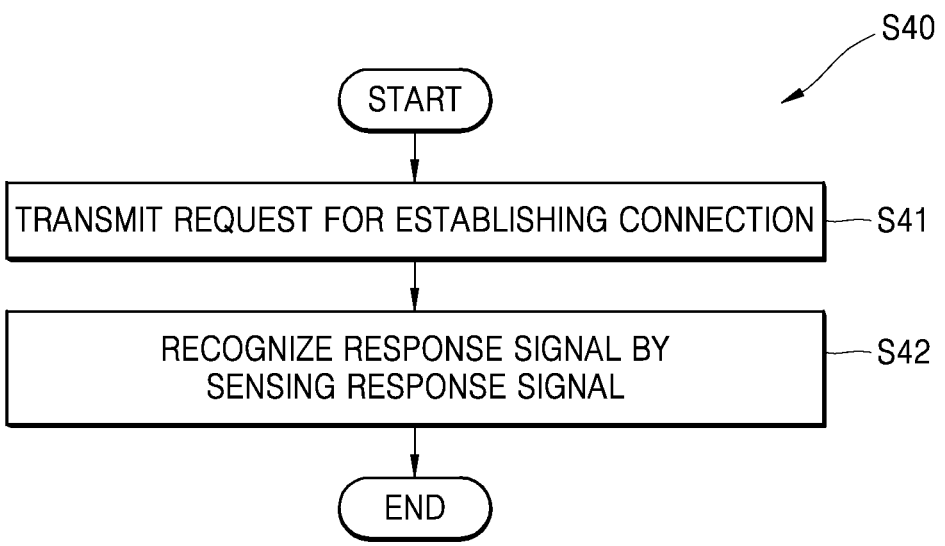
FIGS. 4 and 5 are flowcharts of an illustrative operation methods (S40 and S50) of the example IoT terminal of FIG. 1.
Figure 5:
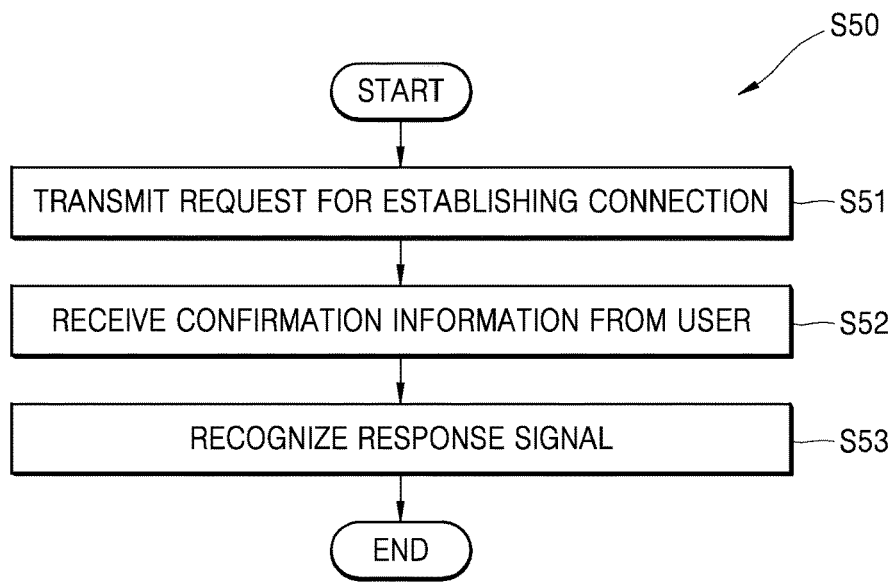

FIGS. 4 and 5 are flowcharts of an illustrative operation methods (S40 and S50) of the example IoT terminal 10 of FIG. 1. FIGS. 4 and 5 are each realized depending on how the IoT terminal 10 recognizes a response signal from the IoT apparatus 20.

Referring to FIGS. 1 and 4, the IoT terminal 10 may transmit a request for establishing a connection to the IoT apparatus 20 (S41). By sensing a response signal from the IoT apparatus 20, the IoT terminal 10 may recognize the response signal from the IoT apparatus 20 (S42).

The IoT terminal 10 may include a sensor for sensing a response signal from the IoT apparatus 20. The sensor may include a camera for sensing a response signal, such as blinking from a light source, or a microphone for sensing a response signal, such as a beeping sound. In addition, the IoT terminal 10 may further include another sensor that may sense a response signal from the IoT apparatus 20.

Referring to FIGS. 1 and 5, the IoT terminal 10 may transmit a request for establishing a connection to the IoT apparatus 20 (S51). The IoT terminal 10 may receive a user input confirming recognition of a response signal from the IoT apparatus 20 (S52). The IoT terminal 10 may include an input unit for receiving a user input confirming recognition. That is, a user may directly recognize a response signal from the IoT apparatus 20, and input, to the IoT terminal 10, a user input confirming recognition. In this case, a response signal essentially is a signal that a user may recognize, such as light within the visible spectrum or sound within the audible frequency range The IoT terminal 10 may recognize the response signal from the IoT apparatus 20 by a user input confirming recognition (S53).

Figure 6:
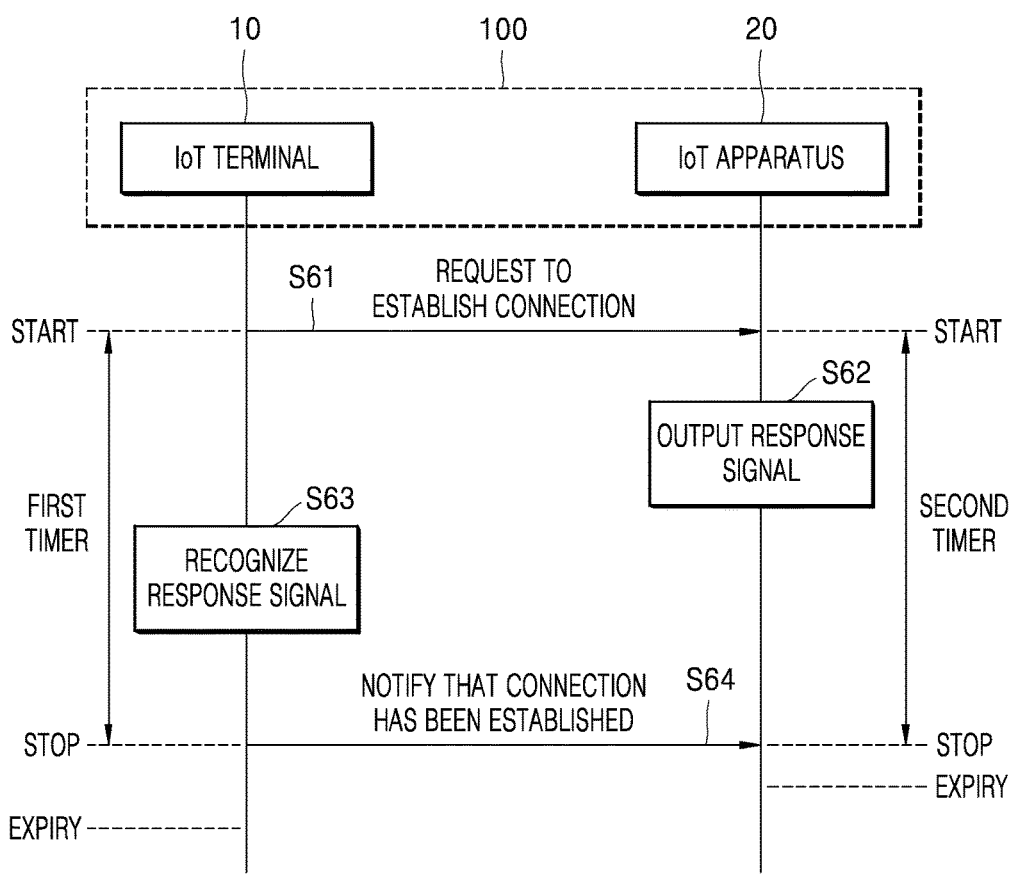
FIG. 6 is a flowchart showing an illustrative operation method of the example IoT system 100 of FIG. 1.

FIG. 6 is a flowchart showing an illustrative operation method of the example IoT system 100 of FIG. 1. The operation method illustrated by the flowchart of FIG. 6 may be another embodiment of the operation method illustrated by the flowchart of FIG. 2. Therefore, the foregoing description may be applied to the operation method illustrated by the flowchart of FIG. 6.

Referring to FIG. 6, the IoT terminal 10 may transmit a request for establishing a connection to the IoT apparatus 20 (S61). The IoT terminal 10 transmitting the request for establishing a connection may start a first timer.

The IoT apparatus 20 receiving the request for establishing a connection may start a second timer. During a time period set by the second timer, the IoT apparatus 20 may output a response signal in response to the request for establishing a connection (S62). During the time period set by the second timer, the IoT apparatus 20 may output the response signal periodically or regularly or continuously.

The time periods set by the first timer and the second timer may be identical to each other, correspond to each other (e.g., operate synchronously with each other), or operate independently of each other. A "time period set by a timer" refers to an operation time period set by the timer. A time period set by a timer may be an operation period from the start time to an expiration time of the timer, or a period from the start time to the stop time of the timer.

During the time period set by the first timer, the IoT terminal 10 may recognize the response signal from the IoT apparatus 20 (S63). The IoT terminal 10 recognizing the response signal may complete establishing a connection with the IoT apparatus 20, and transmit a notification indicating that a connection has been established, to the IoT apparatus 20 (S64).

The IoT terminal 10 recognizing the response signal may stop the first timer before the expiration time of the first timer. In addition, the IoT apparatus 20 that receives the notification may also stop the second timer before the expiration time of the second timer. When the second timer stops, the IoT apparatus 20 may stop outputting the response signal so as to stop responding to the request for establishing a connection.

In the case that the IoT terminal 10 does not recognize the response signal from the IoT apparatus 20 before the first timer expires, the IoT terminal 10 may recognize that establishing a connection with the IoT apparatus 20 has failed. In this case, the IoT terminal 10 may end an operation for establishing a connection. Alternatively, the IoT terminal 10 may re-send a request for establishing a connection in order to re-perform an operation for establishing a connection.

Figure 7:
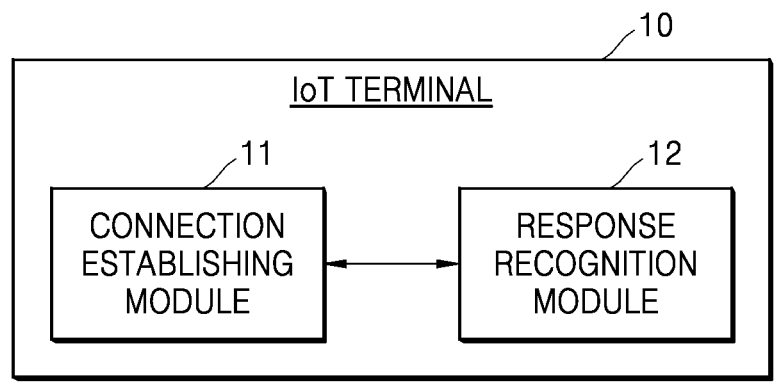
FIG. 7 shows an illustrative configuration of the example IoT terminal 10 of FIG. 1.

FIG. 7 shows an illustrative configuration of the example IoT terminal 10 of FIG. 1.

Referring to FIGS. 1 and 7, the IoT terminal 10 may include a connection establishing module 11 and a response recognition module 12.

The connection establishing module 11 may obtain a request for establishing a connection. In addition, the connection establishing module 11 may transmit the obtained request for establishing a connection, to the IoT apparatus 20. The response recognition module 12 may recognize a response signal from the IoT apparatus 20.

The connection establishing module 11 and the response recognition module 12 may be included in a data processor. The data processor may be variously realized by a central processing unit (CPU), a micro processor, a graphic processing unit (GPU), an application specific integrated circuit (ASIC), and/or other hardware circuitry.

The IoT terminal 10 may include a sensor for sensing the response signal from the IoT apparatus 20. The sensor may include a camera for sensing light output or a microphone for sensing sound output from the IoT apparatus 20. The response recognition module 12 may recognize a response signal by sensing performed by the sensor.

Alternatively, the IoT terminal 10 may include an input unit or device (not shown) (e.g., buttons, switches, keys, touchpad, touchscreen, etc.) that may receive a user input confirming recognition of the response signal from the IoT apparatus 20. When the input unit receives a user input confirming recognition, the response recognition module 12 may recognize a response signal from the IoT apparatus 20.

Figure 8:
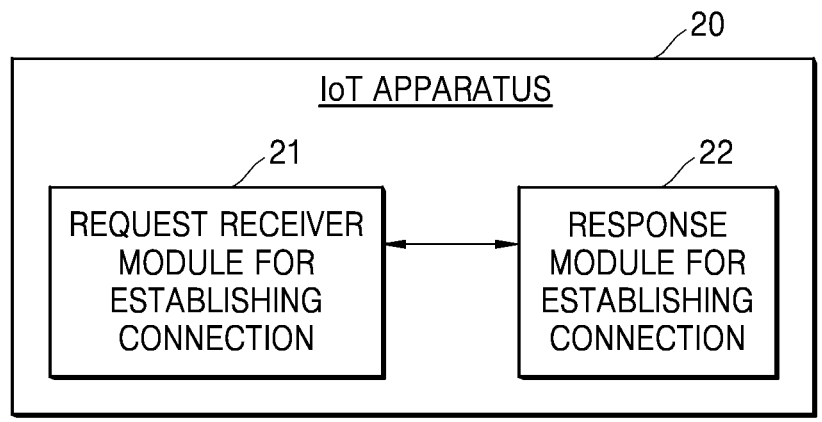
FIG. 8 shows an illustrative configuration of the example IoT apparatus 20 of FIG. 1.

FIG. 8 shows an illustrative configuration of the example IoT apparatus 20 of FIG. 1.

Referring to FIGS. 1 and 8, the IoT apparatus 20 may include a request receiver module 21 for establishing a connection and a response module 22 for establishing a connection.

The request receiver module 21 for establishing a connection is configured to receive, from the IoT terminal 10, a request for establishing a connection. The request receiver module 21 for establishing a connection may be included in a communication unit (e.g., modem, transceiver, radio or other communication circuitry) that receives the request for establishing a connection. The communication unit may include at least one component that may communicate with an external device using various methods, such as wireless communication or short distance (wired or wireless) communication.

The response module 22 for establishing a connection may be configured to output a response signal in response to the request for establishing a connection. The response module 22 for establishing a connection may obtain a response signal related to the request for establishing a connection and output the response signal. The response module 22 for establishing a connection may be included in the data processor. As noted, the data processor may be variously realized by a central processing unit (CPU), a micro processor, a graphic processing unit (GPU), ASIC, and/or other circuitry.

The IoT apparatus 20 may further include an output unit or device, e.g., a light source or a speaker, that may output a response signal to the outside of the apparatus.

Figure 9:
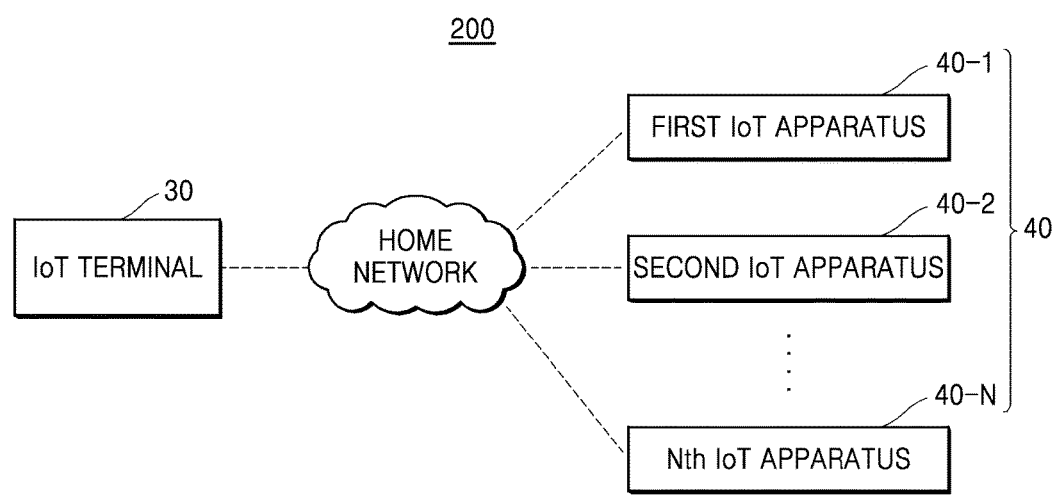
FIG. 9 is a block diagram showing an illustrative configuration of an example IoT system 200.

FIG. 9 is a block diagram showing an illustrative configuration of an example IoT system 200. The IoT system 200 of FIG. 9 may be another embodiment of the IoT system 100 of FIG. 1. Therefore, the foregoing description may be applied to the IoT system 200 of FIG. 9.

Referring to FIG. 9, the IoT system 200 may include an IoT terminal 30 and at least one IoT apparatus 40 (the first to the Nth IoT apparatuses 40-1 through 40-N, where N is a natural number). The IoT terminal 30 and the at least one IoT apparatus 40 may be connected to each other via various methods, such as a home network, wireless communication, or short distance (wired or wireless) communication. That is, a user may control the at least one IoT apparatus 40 through the IoT terminal 30.

Figure 10:
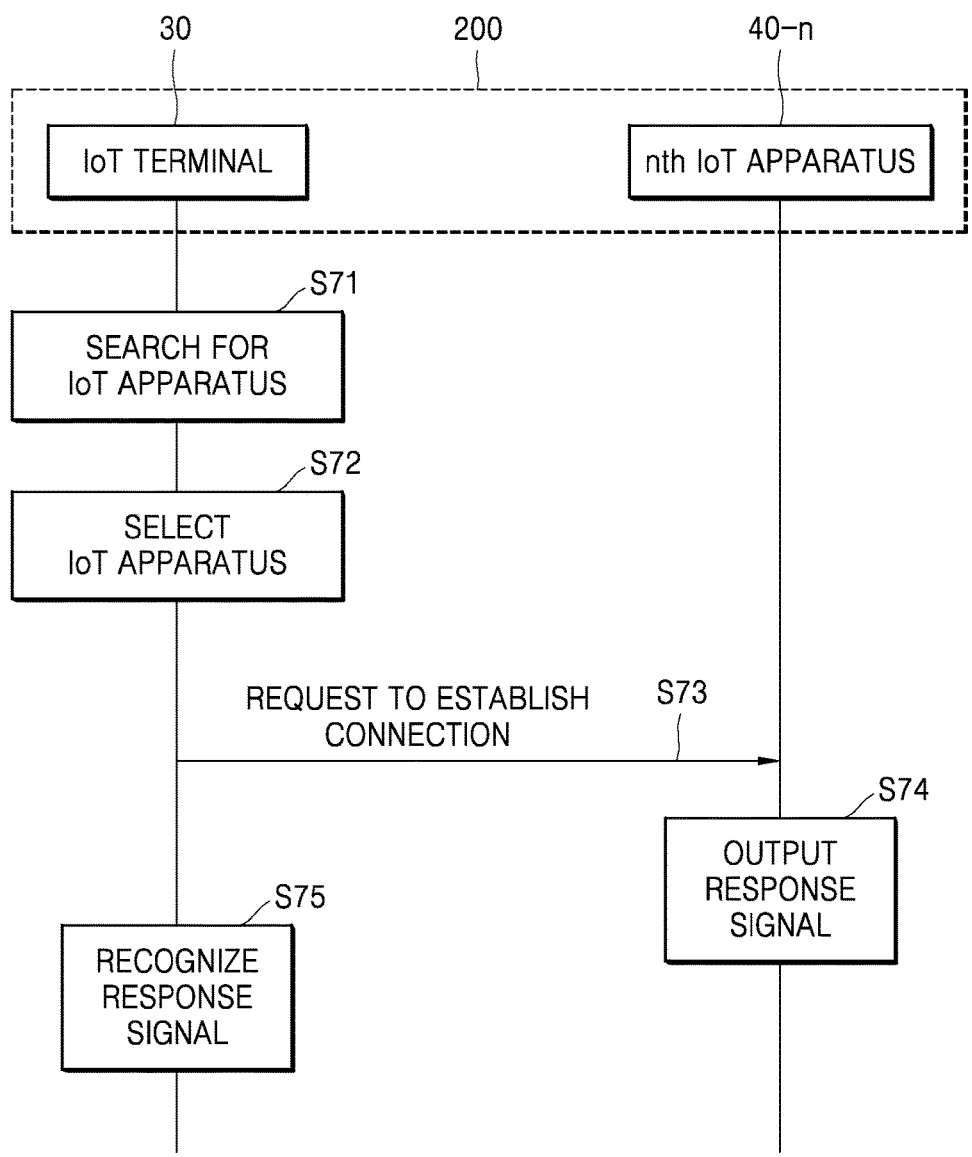
FIG. 10 is a flowchart showing an illustrative operation method of the example IoT system 200 of FIG. 9.

FIG. 10 is a flowchart showing an illustrative operation method of the example IoT system 200 of FIG. 9.

Referring to FIGS. 9 and 10, the IoT terminal 30 may search for the at least one IoT apparatus 40 (S71). The IoT terminal 30 may search for the at least one IoT apparatus 40 that may establish a connection with the IoT terminal 30. The IoT terminal 30 may search for the at least one IoT apparatus 40 in a range where the IoT terminal 30 may be connected to the IoT apparatus 40 via a home network or the like.

The IoT terminal 30 may select an nth IoT apparatus 40-$n$(where n=1, 2, . . . , N), with which a user desires to establish a connection, among the at least one IoT apparatus 40 found based on the search (S72). The IoT terminal 30 may receive a user input selecting the nth IoT apparatus 40-$n$ to establish a connection with. In this case, the IoT terminal 30 may receive a user input selecting the nth IoT apparatus 40-$n$(where n=1, 2, . . . , N).

The IoT terminal 30 may transmit a request for establishing a connection to the selected IoT apparatus 40-$n$(S73). The IoT apparatus 40-$n$ that receives the request for establishing a connection may output a response signal in response to the request for establishing a connection (S74). The IoT terminal 30 may recognize the response signal from the IoT apparatus 40-*n*(S75). Since the foregoing description may be applied to operations S73 to S75, repeated descriptions therefor will be omitted.

Figure 11:
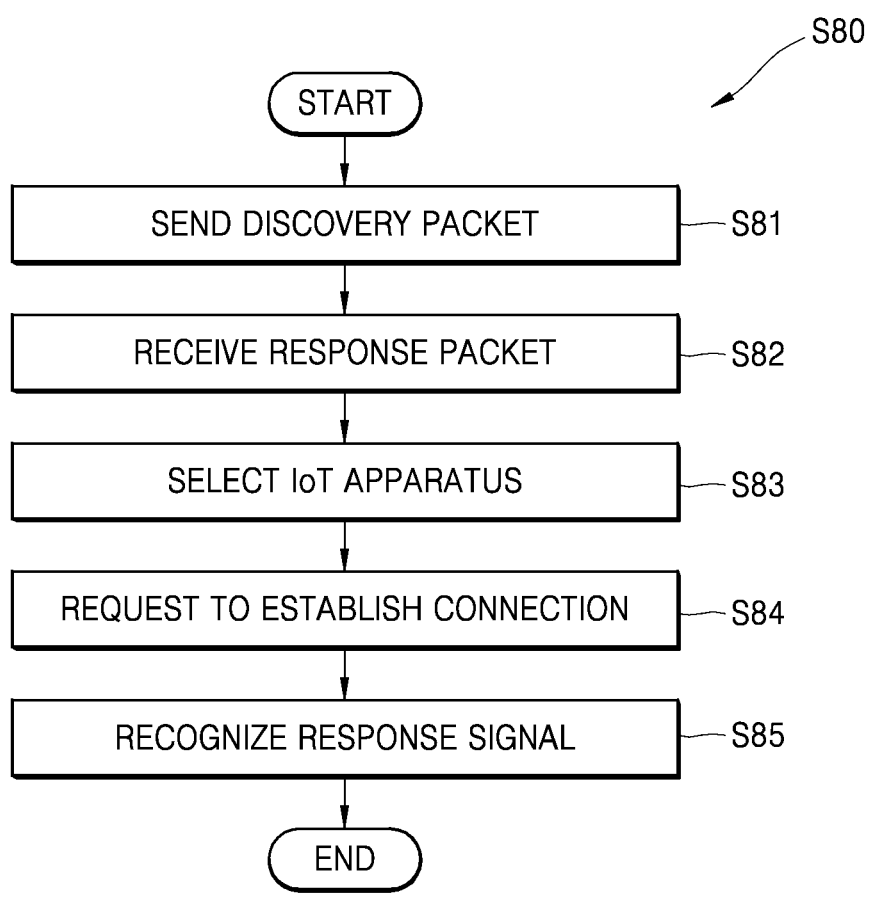
FIG. 11 is a flowchart showing an illustrative operation method (S80) of the example IoT terminal of FIG. 10.

FIG. 11 is a flowchart of an illustrative operation method (S80) of the example IoT terminal 30 of FIG. 10. Since FIG. 11 illustrates the operation method (S80) of the IoT terminal 30 of FIG. 9, the foregoing description may be applied to FIG. 11.

Referring to FIGS. 9 and 11, the IoT terminal 30 may send a discovery packet (or packets) to search for the at least one IoT apparatus 40 (S81). The discovery packet may include a simple service discovery protocol (SSDP), a multicast domain name system (mDNS), or a protocol that provides an automatic discovery of the at least one IoT apparatus 40.

After sending the discovery packet, the IoT terminal 30 may receive a response packet (or packets) from one of the at least one IoT apparatus 40 (S82). As such, the IoT terminal 30 may search for the at least one IoT apparatus 40 by sending the discovery packet (or packets) and receiving the response packet (or packets).

The IoT terminal 30 may select an IoT apparatus from among the searched at least one IoT apparatus 40 to establish a connection with the selected IoT apparatus (S83). The IoT terminal 30 may transmit a request for establishing a connection to the selected IoT apparatus (S84). The IoT terminal 30 may recognize a response signal from the selected IoT apparatus (S85).

Figure 12:
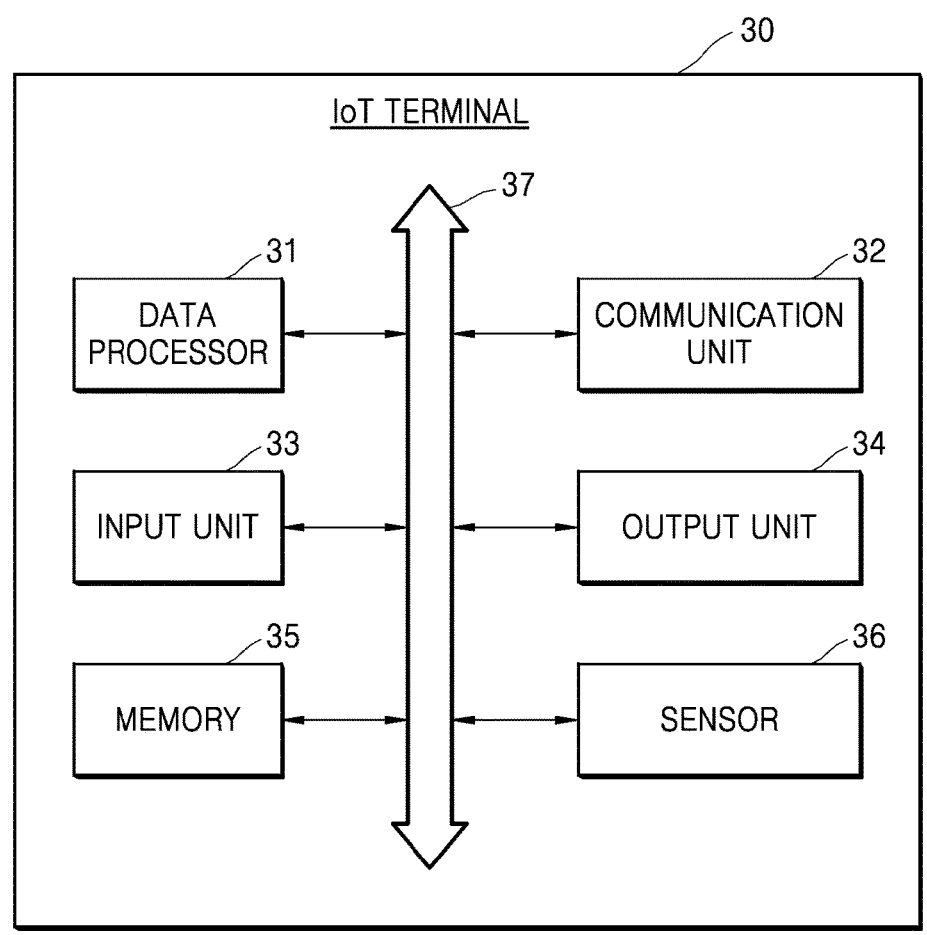
FIG. 12 shows an illustrative configuration of the example IoT terminal 30 of FIG. 9.

FIG. 12 shows an illustrative configuration of the example IoT terminal 30 of FIG. 9. The IoT terminal 30 of FIG. 12 may be another embodiment of the IoT terminal 10 of FIG. 1. Therefore, the description for the IoT terminal 10 above may be applied to the IoT terminal 30 of FIG. 12.

Referring to FIG. 12, the IoT terminal 30 may include a data processor 31, a communication unit 32, an input unit 33, an output unit 34, a memory 35, and a sensor 36. The components included in the IoT terminal 30 may be connected to each other via a bus 37. Some of the illustrated components may be omitted in some implementations, and the IoT terminal 30 may include other components not illustrated.

The data processor 31 may control overall operation of the IoT terminal 30, and process various data necessary for operation of the terminal 30. The data processor 31 may transmit (via the communication unit 32) a request, to an IoT apparatus, for establishing a connection between a user and the IoT apparatus, and recognize a response signal output from the IoT apparatus in response to the request for establishing a connection. The data processor 31 may include the connection establishing module 11 and the response recognition module 12 of FIG. 7. In addition, the above described control of operation of the IoT terminal 30, or data processing required for the operation may be performed by the data processor 31. The data processor 31 may be variously realized as a CPU, a micro processor, a GPU, an ASIC and/or other circuitry.

The sensor 36 may sense a response signal from the IoT apparatus. The sensor 36 may include a camera and/or a microphone. The data processor 31 may recognize a response signal by sensing performed by the sensor 36.

The IoT terminal 30 may communicate with a server or an IoT apparatus via the communication unit 32. The communication unit 32 may include at least one component that enables the terminal 30 to communicate with an external device, such as a server or an IoT apparatus. For example, the communication unit 32 may include a short distance communication module, a wired communication module, a mobile communication module and/or another type of communication circuitry.

The short distance communication module refers to a module for performing short distance communication with an apparatus located within a predetermined distance. Examples of short distance communication technology according to an example embodiment include, but are not limited to, a wireless local area network (LAN), Wi-Fi, Bluetooth, ZigBee, Wi-Fi direct (WFD), ultra wideband (UWB), infrared data association (IrDA), Bluetooth low energy (BLE), and near field communication (NFC).

The wired communication module refers to a module for communicating by using an electric signal or an optical signal. Examples of wired communication technology may include wired communication techniques using a pair cable, a coaxial cable, and an optical fiber cable, and other wired communication techniques that are well known to one of ordinary skill in the art.

The wireless communication module transmits and receives a wireless signal to and from at least one of a base station, an external apparatus, and a server in a mobile communication network. Here, examples of the wireless signal may include a voice call signal, a video call signal, and various types of data according to text/multimedia messages transmission.

The input unit 33 and the output unit 34 may provide a user with a user interface (UI) so as to manipulate the IoT terminal 30. The output unit 34 may output a UI for a user to manipulate the IoT terminal 30. Examples of the output unit 34 include a speaker, a printer, a cathode ray tube (CRT) display, a liquid crystal display (LCD), a plasma display panel (PDP), an organic light emitting diode (OLED) display, a field emission display (FED), a light emitting diode (LED) display, a vacuum fluorescence display (VFD), a digital light processing (DLP) display, a flat panel display (FPD), a 3D display, a transparent display, and other output apparatuses that are well known to one of ordinary skilled in the art.

The input unit 33 may receive a user input commanding to manipulate the IoT terminal 30. Examples of the input unit 33 may include a keyboard, a mouse, a touch screen, a voice recognizer, a fingerprint recognizer, an iris recognizer, and other input devices which are well known to one of ordinary skill in the art.

The memory 35 may store various pieces of information necessary for operation of the IoT terminal 30.

The data processor 31 may search for the at least one IoT apparatus 40. To this end, the data processor 31 may send a discovery packet (or packets), and receive a response packet (or packets) from the at least one IoT apparatus 40.

The memory 35 may store search information, which is information about the at least one IoT apparatus 40 found based on the search. The output unit 34 may output a result of the search, which is a list indicating the at least one IoT apparatus 40 found based on the search. Here, the search list may be output based on the search information stored in the memory 35. The input unit 33 may receive a user input selecting the nth IoT apparatus 40-*n*(where n=1, 2, . . . , N), which is one of the the at least one IoT apparatus 40. The data processor 31 may transmit a request for establishing a connection to the selected nth IoT apparatus 40-*n*.

The data processor 31 may recognize a response signal from the IoT apparatus 40-*n*. For example, the output unit 34 may output a UI to receive a user input indicating whether the user recognizes the response signal from the nth IoT apparatus 40-*n*. Through the output UI, the input unit 33 may receive a user input confirming recognition of the response signal from the IoT apparatus 40-*n*. When the user input confirming recognition is input, the data processor 31 may recognize that the IoT apparatus 40-*n* responded to the request for establishing a connection and may, for example, store in local or remote memory, information indicative of the recognition and/or connection.

Figure 13:
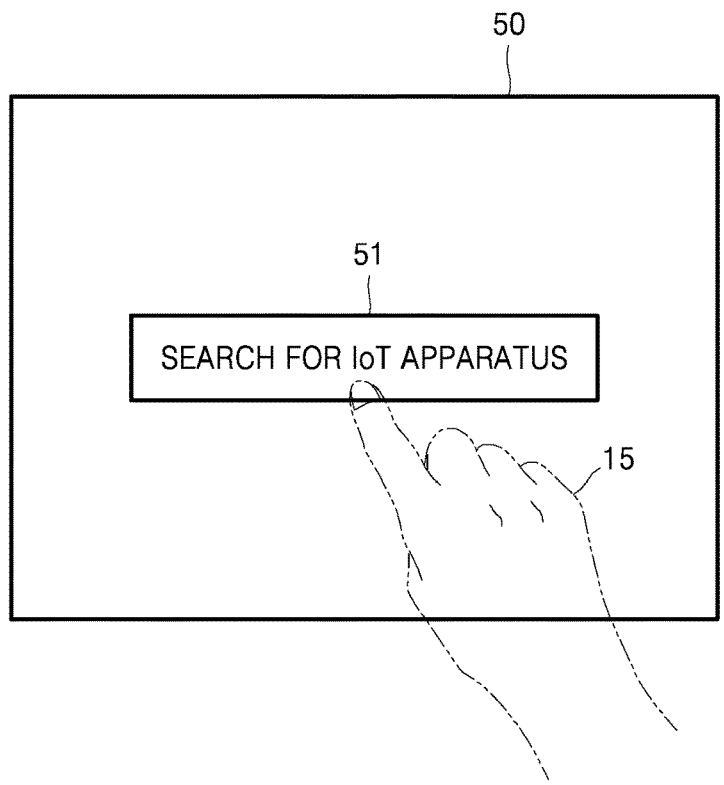
FIGS. 13 to 15 show illustrative screens of an output unit of an example IoT terminal.

FIG. 13 illustrates an example screen 50 of an output unit of an IoT terminal. The screen 50 of FIG. 13 may be a screen of the output unit 34 of the IoT terminal 30 of FIG. 12.

Referring to FIG. 13, the screen 50 may display a search icon 51 for operating search for an IoT apparatus. The search icon 51 is shown as text in FIG. 13; however, FIG. 13 is for illustrative purposes only. The search icon 51 may be realized using various methods, such as a combination of text and figures, which enables a user to recognize the search icon 51. When the user 15 selects the search icon 51 through the input unit 33 of FIG. 12, the IoT terminal 30 of FIG. 12 may execute a search for the IoT apparatus. A method of selecting the search icon 51 may be realized according to various methods depending on an implementation method of the input unit 33 of FIG. 7, for example, touching, clicking, or double-clicking. The IoT terminal 30 of FIG. 12 may search for at least one IoT apparatus, using various methods, such as sending a discovery packet (or packets) and receiving a response packet (or packets).

Figure 14:
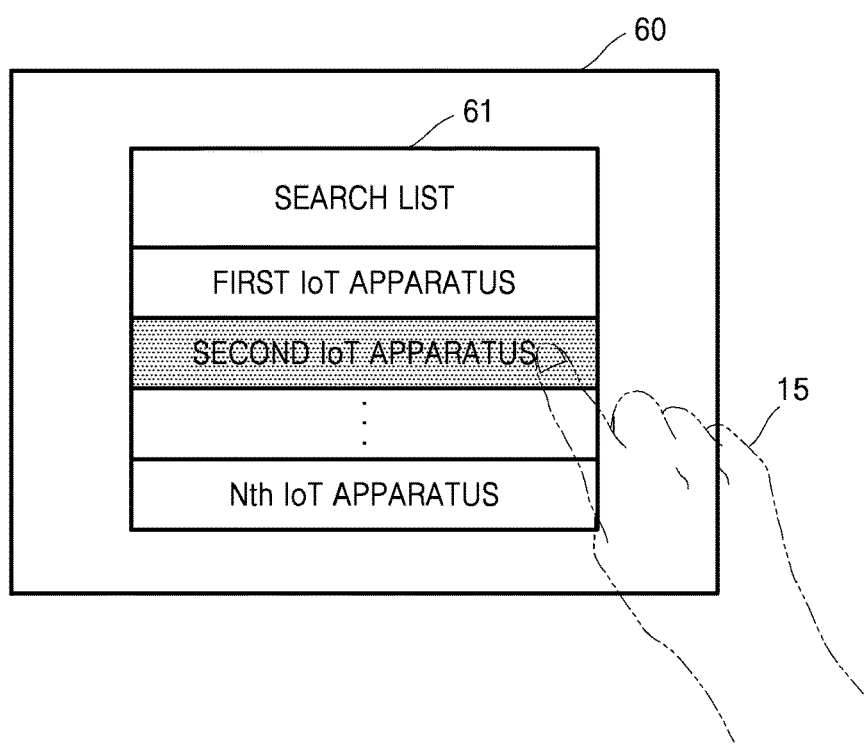

FIG. 14 illustrates an example screen 60 of an output unit of an IoT terminal. The screen 60 of FIG. 14 may be a screen of the output unit 34 of the IoT terminal 30 of FIG. 12.

Referring to FIG. 14, the screen 60 may display a search list 61, which is a list indicating at least one IoT apparatus found based on the search.

The search list 61 may include selection icons (a 'First IoT apparatus', a 'Second IoT apparatus', . . . , and a 'Nth IoT apparatus') for selecting each of the IoT apparatuses. In the search list 61 of FIG. 14, selection icons are shown as text. However, each of the selection icons may be realized by a combination of text and figures. FIG. 14 is for illustrative purposes only, and selection icons may be realized using various methods which allow the user 15 to distinguish and select each of the IoT apparatuses.

By way of an example, such as FIG. 14, the user 15 may select the 'Second IoT apparatus' icon on the search list 61 so as to select the second IoT apparatus. When the second IoT apparatus is selected by the user 10, the IoT terminal 30 of FIG. 10 may transmit a request for establishing a connection between the user 10 and the second IoT apparatus (S73) of FIG. 10.

The user 15 may select an IoT apparatus from the search list 61 using various methods, such as touching, clicking, or double-clicking. The 'second IoT apparatus' icon selected by the user 15 may be visually distinguished from other icons that are not selected.

Figure 15:
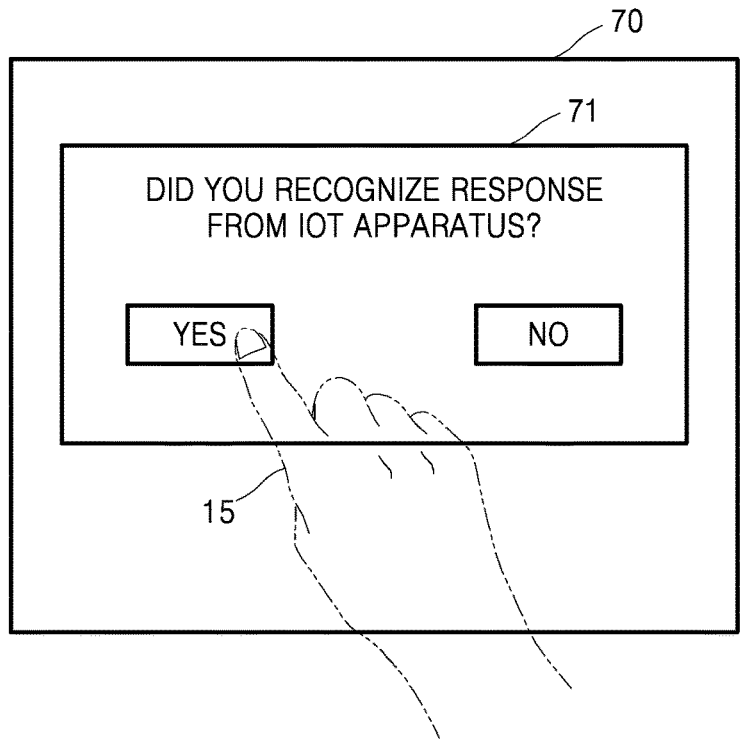

FIG. 15 illustrates an example screen 70 of an output unit of an IoT terminal. The screen 70 of FIG. 15 may be a screen of the output unit 34 of the IoT terminal 30 of FIG. 12.

Referring to FIG. 15, the screen 70 may display a UI 71 to identify whether the user 15 recognized a response signal from the IoT apparatus. The UI 71 may display a message as text to identify whether the user recognizes the response. In FIG. 15, a message, saying 'Did you recognize response from IoT apparatus?' is shown, but this is for illustrative purposes only. The UI 71 may further display icons, such as 'Yes' or 'No', enabling the user to select affirmation or negation with regard to response recognition. The user 15 may select an affirmation ('Yes') icon or a negation ('No') icon from the UI 71 using various methods, such as touching, clicking, or double-clicking.

By way of an example, such as FIG. 15, the user 15 may select in the UI 71 the 'Yes' icon showing affirmation so as to input a user input confirming recognition of a response signal from the IoT apparatus 20. When the user input confirming recognition is input, the IoT terminal 30 of FIG. 12 may process that the IoT terminal 30 recognized the response signal from the IoT apparatus 20 in response to the request for establishing a connection.

The 'No' icon indicating negation may be selected from the UI 71, or the user input confirming recognition may not be input from the user 15 until the first timer (refer to FIG. 6) expires. In this case, the IoT terminal 30 of FIG. 12 may process that the IoT terminal 30 of FIG. 12 did not recognize the response signal from the IoT apparatus 20. In this case, the IoT terminal 30 of FIG. 12 may process that the IoT terminal 30 of FIG. 12 failed to establish a connection with the IoT apparatus 20. Here, the IoT terminal 30 of FIG. 12 may end an operation for establishing a connection. Alternatively, the IoT terminal 30 of FIG. 12 may re-perform an operation for establishing a connection by re-sending a request for establishing a connection.

Figure 16:
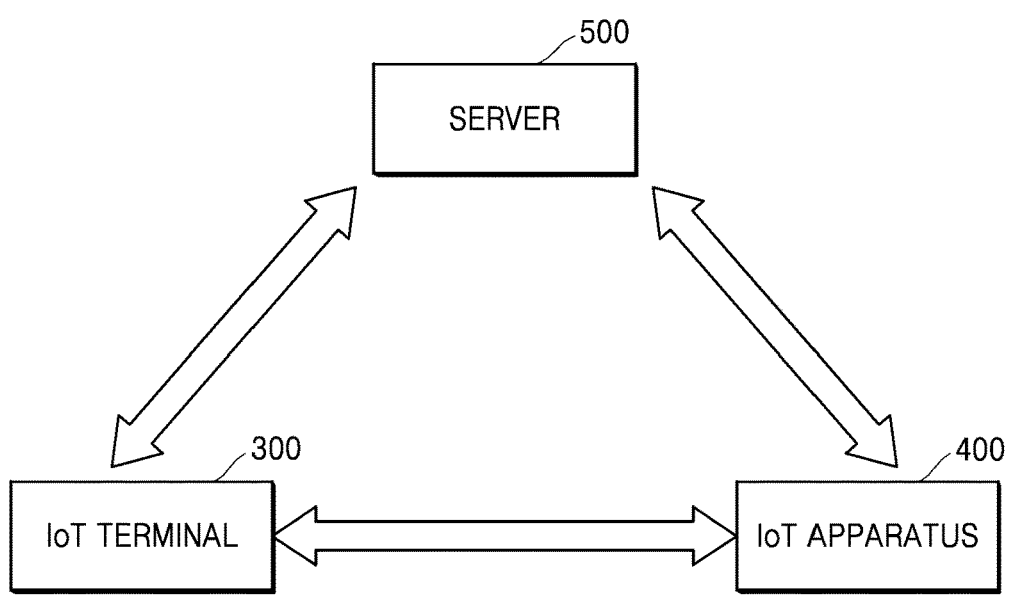
FIG. 16 is a block diagram showing an illustrative configuration of an example IoT system 1000.

FIG. 16 is a block diagram showing an illustrative configuration of an example IoT system 1000.

Referring to FIG. 16, the IoT system 1000 includes the IoT terminal 300, the IoT apparatus 400, and a server 500. The foregoing may be applied to the IoT terminal 300 and the IoT apparatus 400, even if not described in the following.

The server 500 may be a computer configured to provide IoT service to a user. Alternatively, the server 500 may be or include a non-transitory computer-readable recording medium having recorded thereon a program for causing a computer to execute the IoT service.

The server 500 may be wirelessly connected to the IoT terminal 300 and the IoT apparatus 400. Therefore, the server 500 may communicate with the IoT terminal 300 and the IoT apparatus 400. As a result, the IoT terminal 300 may access to and control the IoT apparatus 400 through the server 500.

Figure 17:
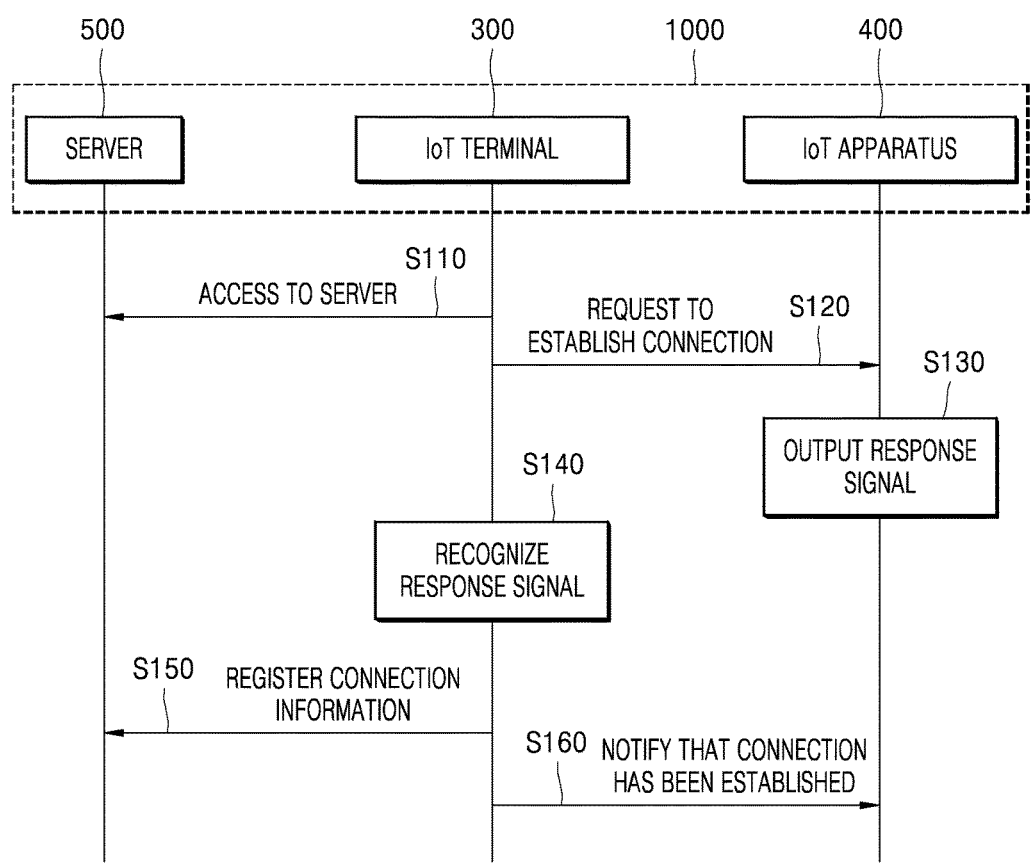
FIG. 17 is a flowchart showing an illustrative operation method of the example IoT system 1000 of FIG. 16.

FIG. 17 is a flowchart showing an illustrative operation method of the example IoT system 1000 of FIG. 16.

Referring to FIG. 17, the IoT terminal 300 may access the server 500 (S110). The IoT terminal 300 may access the server 500, and then, input user information to the server 500. A user may input user information by registering as a new user through the IoT terminal 300, or by logging into the server 500 using a registered account.

The IoT terminal 300 may transmit a request for establishing a connection to the IoT apparatus 400 (S120). The IoT apparatus 400 that receives the request for establishing a connection may output a response signal in response to the request for establishing a connection (S130). The IoT terminal 300 may recognize the response signal from the IoT apparatus 400 (S140). The IoT terminal 300 may recognize the response signal from the IoT apparatus 400 using various methods described above. In addition, the IoT terminal 300 may adjust a recognition period of the response signal from the IoT apparatus 400 by using a timer.

When the IoT terminal 300 recognizes the response signal from the IoT apparatus 400, the IoT terminal 300 may register connection information in the server 500 (S150). The registered connection information may indicate that a connection was established between the user and the IoT apparatus 400.

The IoT terminal 300 may transmit a notification to the IoT apparatus 400 indicating that a connection has been established (S160).

Figure 18:
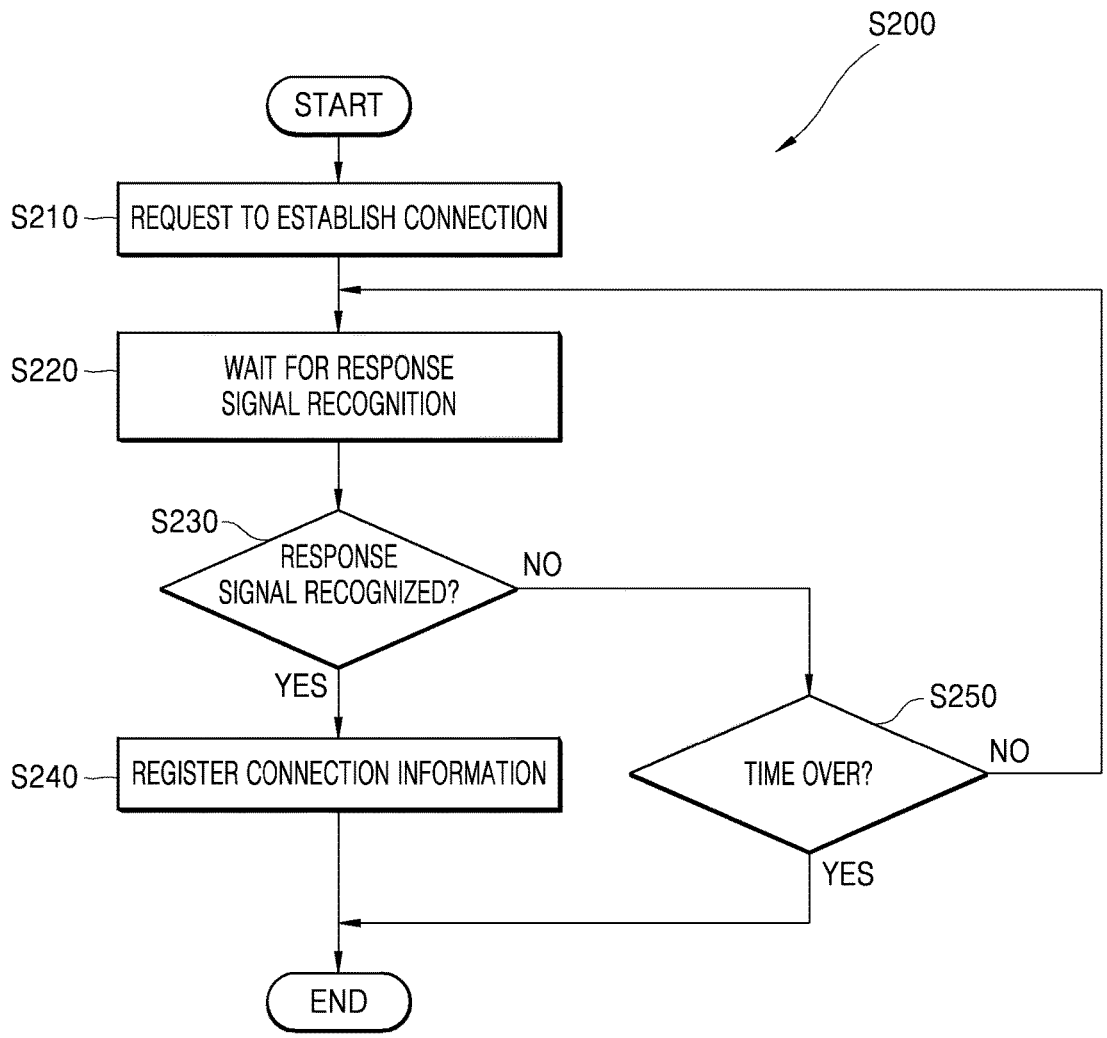
FIG. 18 is a flowchart showing an illustrative operation method (S200) of the example IoT terminal of FIG. 16.

FIG. 18 is a flowchart of an illustrative operation method (S200) of the example IoT terminal 300 of FIG. 16.

Referring to FIGS. 16 and 18, the IoT terminal 300 may transmit a request for establishing a connection to the IoT apparatus 400 (S210). The IoT terminal 300 may wait for a response recognition (S220). Here, the IoT terminal 300 may start a timer, e.g., the first timer of FIG. 7.

The IoT terminal 300 may determine whether the IoT apparatus 400 recognizes a response signal (S230). When the IoT terminal 300 recognizes the response signal from the IoT apparatus 400, the IoT terminal 300 may register connection information between the user and the IoT apparatus 400 in the server 500 (S240).

When the IoT terminal 300 has not recognized a response signal from the IoT apparatus 400, the IoT terminal 300 may determine whether a predetermined time period has elapsed (S250). In the case that the predetermined time period is not over, the IoT terminal 300 may continue to wait for the response recognition (S220). In the case that the predetermined time period is over, the IoT terminal 300 may end an operation for establishing a connection.

Figure 19:
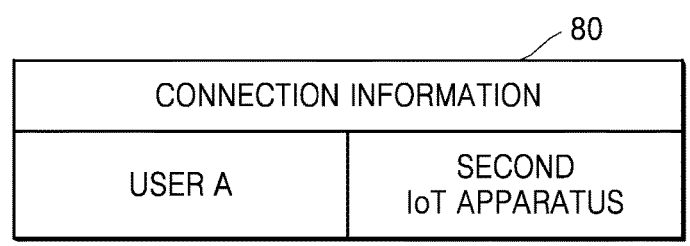
FIG. 19 illustrates an example of connection information to be registered in a server.

FIG. 19 illustrates an example of connection information 80 to be registered in a server.

Referring to FIG. 19, the connection information 80 is about an IoT apparatus which is established a connection with a user. The connection information 80 may be data mapping a user identifier that specifies a user (a user A) and an IoT apparatus identifier that specifies an IoT apparatus (the second IoT apparatus). The connection information 80 is an example of connection information to be registered in a server in the case that a connection is established between a user A and a second IoT apparatus according to an embodiment.

As such, according to an example embodiment, a connection may be established between a user and an IoT apparatus without a physical contact of the user with the IoT apparatus. Therefore, user-friendliness may improve since it is not required anymore for the user to use an IoT terminal to move to and contact the IoT apparatus.

In addition, as the IoT apparatus uses a response signal having a limit in terms of a transmission distance, the user is within a predetermined range from the IoT apparatus. Therefore, reliability may improve in that the user establishing a connection with the IoT apparatus is very likely a legitimate or authorized user of the IoT terminal.

The embodiments of the concepts described herein may be written as computer programs and may be implemented in general-use digital computers that execute the programs using a computer-readable recording medium.

Examples of the computer-readable recording medium include magnetic storage media (e.g., ROM, floppy disks, hard disks, etc.), optical recording media (e.g., CD-ROMs, or DVDs), etc), and transmission media such as Internet transmission media.

While the present disclosure has been particularly shown and described with reference to example embodiments thereof, it will be understood by those of ordinary skill in the art that various changes in form and details may be made therein without departing from the spirit and scope of the present disclosure as defined by the following claims.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A control apparatus for controlling an Internet of Things (IoT) apparatus, the control apparatus comprising:
   communication circuitry;
   a sensor; and
   a data processor configured to
      control the communication circuitry to transmit a request, to the IoT apparatus, for establishing a connection to enable control of the IoT apparatus by the control apparatus;
      control the sensor to sense a physical signal which is received from the IoT apparatus in response to the request for establishing the connection;
      control recognizing the physical signal as a response signal output from the IoT apparatus, the response signal being a signal whose transmission distance is limited to within a predetermined radius; and
      control establishing of the connection for enabling control of the IoT apparatus by the control apparatus, based on recognizing the response signal.

2. The control apparatus of claim 1, wherein the physical signal comprises at least one of light and sound.

3. The control apparatus of claim 1, wherein, when the request for establishing a connection is transmitted, the data processor is configured to start a timer, and the control apparatus is configured to recognize the physical signal from the IoT apparatus during a time period set by the timer.

4. The control apparatus of claim 1, wherein the data processor is configured to search for at least one apparatus to establish a connection, to select one of the at least one apparatus as the IoT apparatus, and to transmit the request for establishing a connection to the selected IoT apparatus.

5. The control apparatus of claim 4, wherein the data processor is configured to search for the at least one apparatus by sending one or more discovery packets and receiving one or more response packets from the at least one apparatus.

6. The control apparatus of claim 4, further comprising:
   a display configured to display a search list indicating at least one apparatus found based on the search; and
   an input device configured to receive input for selecting one of the at least one apparatus as the IoT apparatus.

7. The control apparatus of claim 1, further comprising:
   an input device configured to receive input for confirming recognition of the physical signal, wherein the data processor is configured to recognize the physical signal based on the input confirming recognition.

8. The control apparatus of claim 7, further comprising a display configured to display a user interface (UI) for receiving input for indicating recognition of the physical signal.

9. The control apparatus of claim 1, wherein the data processor is configured to register connection information in a server,
   wherein the connection information indicates an established connection to the IoT apparatus.

10. The control apparatus of claim 1, wherein, when the data processor recognizes the physical signal, the data processor is configured to transmit a notification to the IoT apparatus indicating that a connection to the IoT apparatus has been established.

11. A method of operating a control apparatus for controlling an Internet of Things (IoT) apparatus, the method comprising:
   transmitting, to the IoT apparatus, a request for establishing a connection to enable control of the IoT apparatus by the control apparatus;
   sensing, by a sensor, a physical response signal which is received from the IoT apparatus in response to the request for establishing the connection;
   recognizing the physical signal as a response signal output from the IoT apparatus, the response signal being a signal whose transmission distance is limited to within a predetermined radius; and
   establishing the connection for enabling control of the IoT apparatus by the control apparatus based on recognizing the physical signal.

12. The method of claim 11, wherein the physical signal comprises at least one of light and sound.

13. The method of claim 11, wherein the recognizing of the physical signal comprises:
   starting a timer when the request for establishing a connection is transmitted; and
   recognizing the physical signal from the IoT apparatus during a time period set by the timer.

14. The method of claim 11, further comprising:
   searching for at least one apparatus to establish a connection;
   selecting one of the at least one apparatus as the IoT apparatus; and
   transmitting the request for establishing a connection to the IoT apparatus.

15. The method of claim 14, wherein the searching for the at least one apparatus comprises:
   sending one or more discovery packets;
   receiving one or more response packets from the at least one apparatus; and
   determining the at least one apparatus based on the response packet.

16. The method of claim 14, wherein the selecting of the IoT apparatus comprises:
   displaying a search list indicating at least one apparatus found based on the search; and
   receiving input for selecting one of the at least one apparatus as the IoT apparatus.

17. The method of claim 11, wherein the recognizing of the physical signal comprises:
   receiving input for confirming recognition of the physical signal, and
   recognizing the physical signal based on the input confirming recognition.

18. The method of claim 17, further comprising:
   displaying a UI for receiving input for indicating recognition of the physical signal.

19. The method of claim 11, further comprising:
   registering connection information in a server,
   wherein the connection information indicates an established connection to the IoT apparatus.

20. A non-transitory computer-readable recording medium having recorded thereon a program which, when executed by a computer, controls a control apparatus for controlling an IoT (Internet of Things) apparatus to perform operations comprising:
   transmitting, to the IoT apparatus, a request for establishing a connection to enable control of the IoT apparatus by the control apparatus;
   sensing, by a sensor, a physical signal, which is received from the IoT apparatus in response to the request for establishing the connection;
   recognizing the physical response signal as a response signal output from the IoT apparatus, the response signal being a signal whose transmission distance is limited to within a predetermined radius; and
   establishing the connection for enabling control of the IoT apparatus by the control apparatus based on recognizing the physical signal.

21. An IoT apparatus comprising:
   a data processor configured to control:
      receiving, from a control apparatus, via a communication interface, a request for establishing a connection to enable control of the IoT apparatus by the control apparatus;
      transmitting a physical signal to the control apparatus, in response to the request, the physical signal being sensible by a sensor of the control apparatus and recognizable by the control apparatus when the control apparatus is within a predetermined radius from the IoT apparatus, the physical signal being a signal whose transmission distance is limited to within the predetermined radius; and
      operating the IoT apparatus based on control by the control apparatus using the established connection.

* * * * *